(12) United States Patent
Scharpf

(10) Patent No.: US 8,967,591 B2
(45) Date of Patent: Mar. 3, 2015

(54) TRIP COCK FAULT DETECTOR

(75) Inventor: Robert N. Scharpf, Greenville, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 966 days.

(21) Appl. No.: 13/034,042

(22) Filed: Feb. 24, 2011

(65) Prior Publication Data

US 2012/0217427 A1 Aug. 30, 2012

(51) Int. Cl.
*F16K 31/524* (2006.01)
*B60T 7/18* (2006.01)
*B60T 17/22* (2006.01)

(52) U.S. Cl.
CPC .................................... *B60T 17/228* (2013.01)
USPC ............... 251/263; 251/38; 251/67; 251/325; 188/111; 303/22.7

(58) Field of Classification Search
CPC ... B60T 8/1893; B60T 17/228; B60T 13/665; B60T 15/048; B60T 15/54; F16K 31/52408
USPC ............ 137/68.11, 797, 70; 188/111; 251/14, 251/26, 27, 38, 43, 66, 67, 74, 257, 263, 251/321, 325; 303/22.6, 22.7, 128
See application file for complete search history.

(56) References Cited

U.S. PATENT DOCUMENTS

| | | | |
|---|---|---|---|
| RE14,067 E * | 2/1916 | Perkins | 251/38 |
| 1,390,851 A * | 9/1921 | Winckler | 251/38 |
| 1,487,991 A | 3/1924 | Webb, Jr. | |
| 1,511,891 A * | 10/1924 | Knell | 251/38 |
| 1,529,058 A | 3/1925 | Folker | |
| 1,543,988 A * | 6/1925 | Davis | 251/37 |
| 1,584,299 A | 5/1926 | Jenkins et al. | |
| 1,618,045 A * | 2/1927 | Bahan et al. | 123/90.52 |
| 2,028,726 A | 1/1936 | Stewart | |
| 2,081,465 A | 5/1937 | Stewart et al. | |
| 2,345,306 A * | 3/1944 | Van Der Werff | 251/38 |
| 2,635,925 A | 4/1953 | Wade | |
| 2,656,145 A | 10/1953 | Lawson | |
| 3,022,119 A | 2/1962 | May | |
| 3,502,374 A | 3/1970 | Billeter | |
| 3,992,062 A | 11/1976 | Jeffrey et al. | |
| 4,043,604 A | 8/1977 | Hart | |

(Continued)

FOREIGN PATENT DOCUMENTS

AU 6747381 A 8/1981
CA 662081 A 4/1963

(Continued)

OTHER PUBLICATIONS

Wabtec Passenger Transit Operation and Maintenance Information "D-1A" and "D-1" Trip Valve Assemblies. Apr. 2008, Wabtec Passenger Transit, Spartanburg, SC.

*Primary Examiner* — Graig Schneider
*Assistant Examiner* — Frederick D Soski
(74) *Attorney, Agent, or Firm* — The Webb Law Firm

(57) ABSTRACT

A trip cock device includes a housing, a cam dog, a handle engaging the cam dog, a piston assembly at least partially received within the housing, and a fault detection valve secured to the piston assembly. The piston assembly includes a piston and the fault detection valve is configured to open and close. The fault detection valve engages the cam dog when closed.

14 Claims, 4 Drawing Sheets

(56) References Cited

U.S. PATENT DOCUMENTS

| | | | |
|---|---|---|---|
| 4,404,987 A | | 9/1983 | Bridigum et al. |
| 5,137,256 A | * | 8/1992 | Zipprath ............... 251/129.02 |
| 5,188,591 A | * | 2/1993 | Dorsey, III ................. 604/33 |
| 5,522,796 A | * | 6/1996 | Dorsey, III ................. 604/118 |

FOREIGN PATENT DOCUMENTS

| | | |
|---|---|---|
| CA | 1193299 A1 | 9/1985 |
| DE | 1755238 A | 11/1971 |
| DE | 1755914 A | 11/1971 |
| DE | 2457204 A1 | 6/1976 |
| FR | 1295404 | 6/1962 |
| FR | 82900 | 4/1964 |
| GB | 191109130 A | 7/1910 |
| GB | 191010925 A | 4/1911 |
| GB | 191105378 A | 6/1911 |
| GB | 191020942 A | 8/1911 |
| GB | 191126763 A | 2/1912 |
| GB | 191402298 A | 12/1914 |
| GB | 191412961 A | 4/1915 |
| GB | 191505769 A | 5/1915 |
| GB | 191415279 A | 6/1915 |
| GB | 101073 A | 8/1916 |
| GB | 191511941 A | 10/1916 |
| GB | 213055 A | 3/1924 |
| GB | 215251 A | 5/1924 |
| GB | 219552 A | 7/1924 |
| GB | 237102 A | 7/1925 |
| GB | 431725 A | 7/1935 |
| GB | 850450 A | 10/1960 |
| GB | 1535206 A | 12/1978 |
| JP | 4138140 | 12/1991 |
| RU | 84802 U | 7/2009 |

\* cited by examiner

TRIP COCK FAULT DETECTOR

BACKGROUND OF THE INVENTION

1. Field of the Invention

The present invention relates to a trip cock device and, more particularly, to a trip cock fault detection device utilized on a rail vehicle.

2. Description of Related Art

Trip cock devices are mounted on rail cars and are connected to a brake pipe. The trip cock device is actuated by a trip arm positioned adjacent to the track. The trip arm may be positioned in an area that is restricted from train travel. When the train enters the prohibited area, the trip cock device is triggered by the trip arm and causes the brake pipe to vent to atmosphere thereby resulting in an emergency brake application.

A conventional trip cock device 1 is shown in FIGS. 1 and 2. The trip cock device 1 includes a handle 3, a cam dog 5, a piston assembly 7, and a pilot valve assembly 9. The trip cock device 1 initiates an emergency brake application when the handle 3 is rotated beyond a calibrated point. Moving the handle 3 causes the cam dog to move upwardly such that the cam dog engages the piston assembly 7. The movement of the piston assembly 7 causes an inlet port 11 to be blocked such that brake pipe air from a brake pipe inlet 13 is prevented from entering a chamber 15 on the topside of the piston assembly 7. The brake pipe air is then open to atmosphere via an exhaust opening 17 and the pressure of the brake pipe drops to initiate the emergency application of the brakes. The piston assembly 7 moves further upward to contact the pilot valve assembly 9 thereby causing the pilot valve to move upward and permitting the residual air in the chamber 15 to pass by the pilot valve and exhaust to atmosphere. When the brake pipe supply air drops below the force of a piston spring 19, the piston assembly 7 will return to its seat and the pilot valve spring returns the pilot valve to its seat. The handle 3 is returned to its position via a torsion spring (not shown).

With conventional trip cocks, such as the one shown in FIGS. 1-2, there are failure modes that cause the trip cock to malfunction. For example, with conventional trip cocks, the trip cock could become inoperable if the cam dog breaks or falls off or if the handle would fall off. If not properly manufactured or assembled, the cam dog, cam dog pin, cotter pin, handle, handle bolt, or handle bolt nut could lead to failures of the cam dog or handle. A broken or missing cam dog or missing handle would result in the main piston failing to open when the trip cock passes over a trip arm such that the emergency brakes are not applied when necessary.

SUMMARY OF THE INVENTION

In one embodiment, a trip cock device includes a housing, a cam dog, a handle engaging the cam dog, a piston assembly at least partially received within the housing, and a fault detection valve secured to the piston assembly. The piston assembly includes a piston and the fault detection valve is configured to open and close. The fault detection valve engages the cam dog when closed.

The fault detection valve may be movable relative to the piston between a first position and a second position with the fault detection valve biased toward the cam dog and engaging the cam dog when in the first position. The piston assembly may include a piston having a first side and a second side with the second side of the piston defining an opening and the first side of the piston defining a port opening in fluid communication with the opening in the second side of the piston. A portion of the fault detection valve may be positioned within the opening in the second side of the piston. The fault detection valve may comprise a body and a valve spring with the body having a first end and a second end and defining a central opening. The central opening of the fault detection valve may extend from the first end of the body to a position intermediate the first end and the second end of the body with the central opening of the body receiving a portion of the valve spring of the fault detection valve. The body of the fault detection valve may define a port that is in fluid communication with the central opening.

The body of the fault detection valve may be movable relative to the piston between a first position and a second position with the body of the fault detection valve biased toward the cam dog by the valve spring when in the first position. The port of the body of the fault detection valve may be configured to be closed to atmosphere in the first position when the fault detection valve is closed and open to atmosphere in the second position when the fault detection valve is open. The piston assembly may further include a stud having a central opening with a portion of the stud secured within the opening in the second side of the piston. A portion of the body of the fault detection valve is received by and movable within the central opening of the stud. The body of the fault detection valve may include a flange positioned adjacent to the first end of the body with the flange configured to engage the stud when the fault detection valve is in the second position. The port of the fault detection valve may be positioned within the central opening of the stud when in the first position, and the port of the fault detection valve may be positioned outside of the central opening of the stud when in the second position. The body of the fault detection valve may include a spring seat that engages a portion of the valve spring. The spring seat of the fault detection valve may include a protrusion extending radially inward from the body of the fault detection valve.

In another embodiment, a fault detection valve for a trip cock device includes a body having a first end and a second end, and a biasing member. The body defines a central opening and a port. The biasing member is configured to move the body between a first position where the port is closed to atmosphere and a second position where the port is open to atmosphere. The body is configured to stay in the first position through engagement with a portion of the trip cock device.

The body may be configured to engage a cam dog of the trip cock device. The central opening of the body may extend from the first end of the body to a position intermediate the first end and the second end of the body. The biasing member may include a compression spring where a portion of the compression spring is received within the central opening of the body. The body may include a spring seat that extends radially inward from the body with a first end of the compression spring engaging the spring seat and a second end of the compression spring configured to engage a piston of the trip cock device. The body may include a flange positioned adjacent the first end of the body with the flange configured to limit movement of the body. The fault detection valve may further include a seal configured to close the port from atmosphere when the body is in the first position.

DESCRIPTION OF THE PREFERRED EMBODIMENTS

Figure 1:
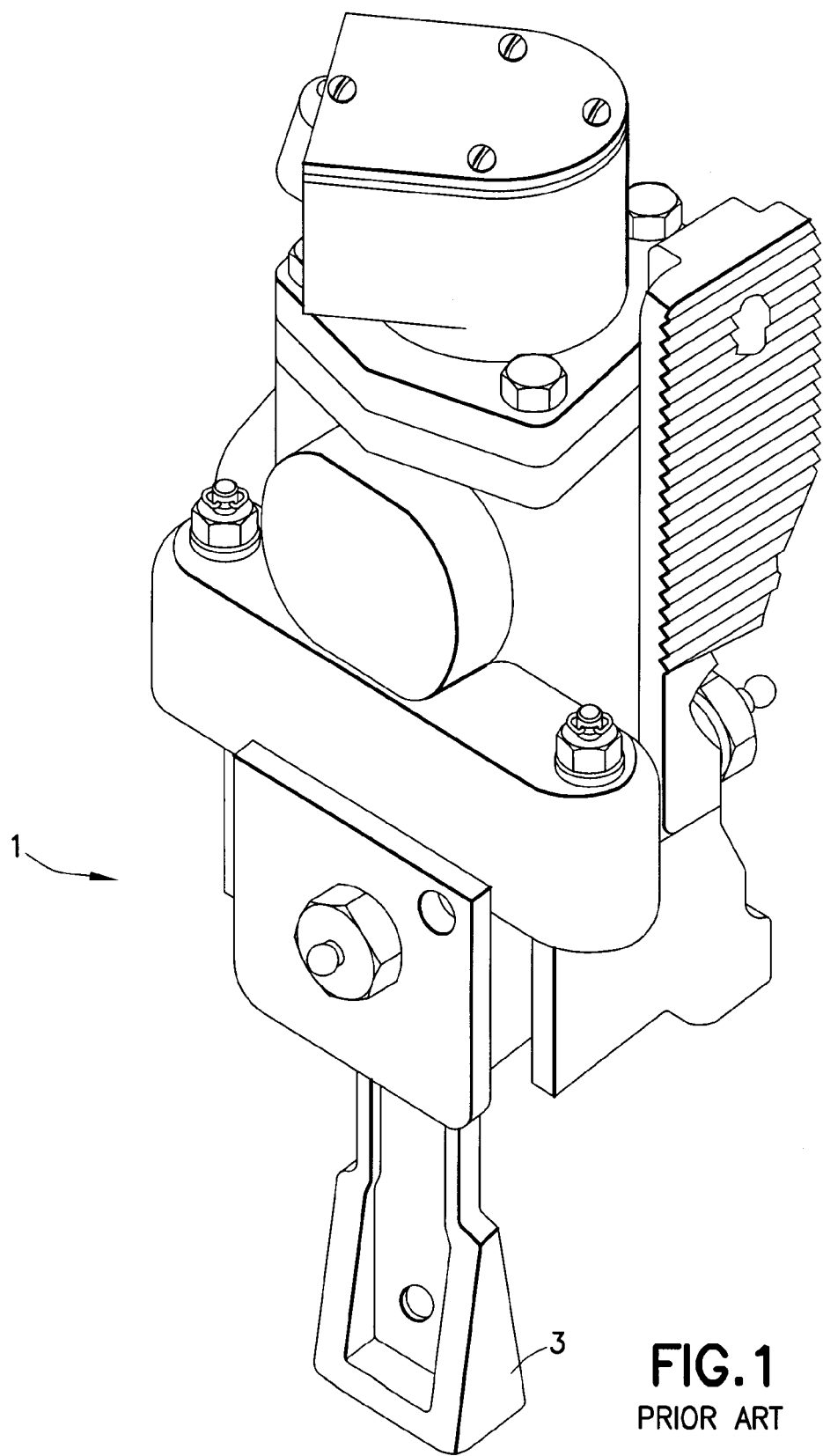
FIG. 1 is a perspective view of a conventional trip cock device.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is to be understood that the specific apparatus illustrated in the attached figures and described in the following specification is simply an exemplary embodiment. Hence, specific dimensions and other physical characteristics related to the embodiments disclosed herein are not to be considered as limiting.

Figure 3:
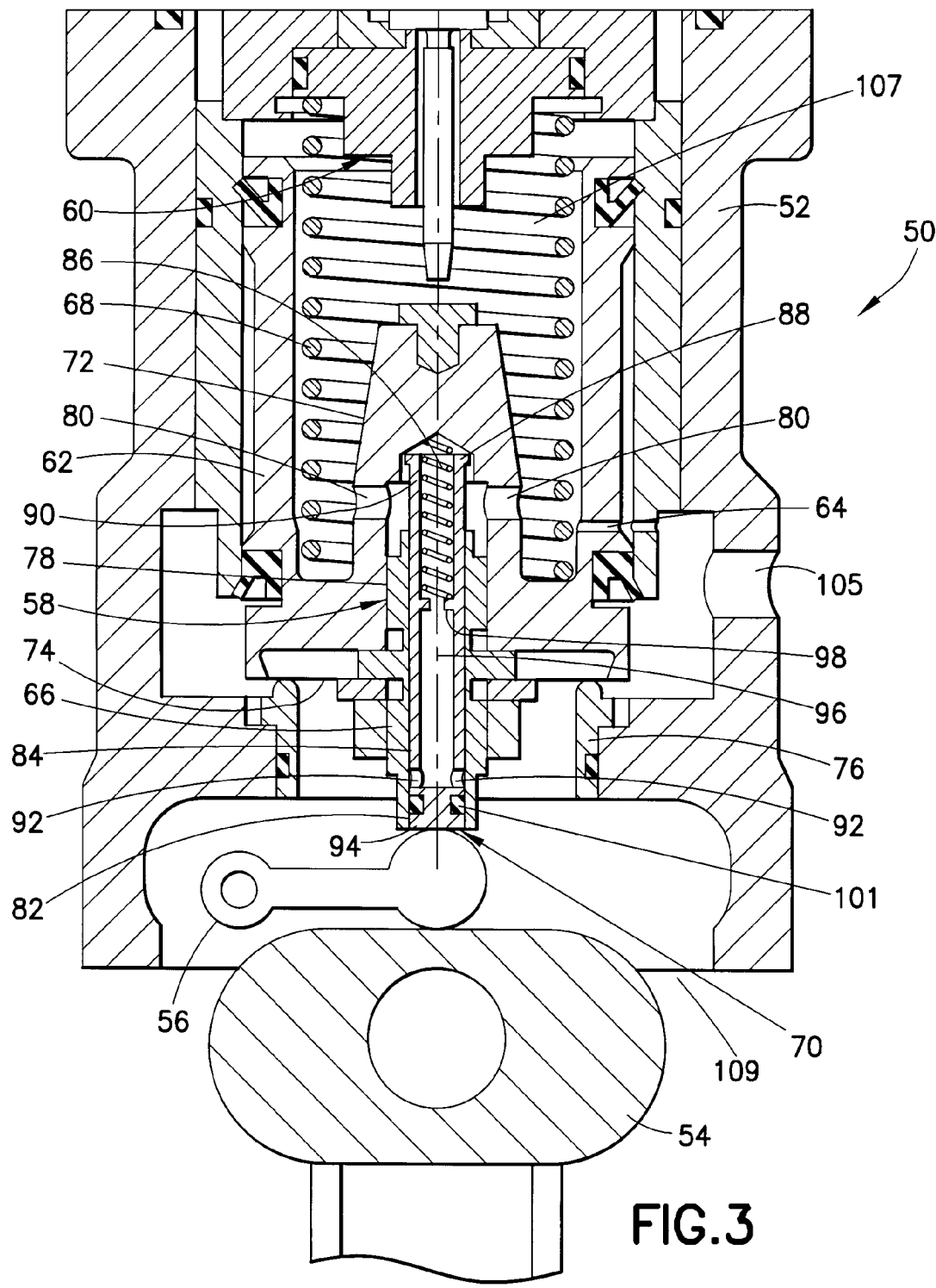
FIG. 3 is a cross-sectional view of a trip cock device according to one embodiment, showing the trip cock device in a first position.
Figure 4:
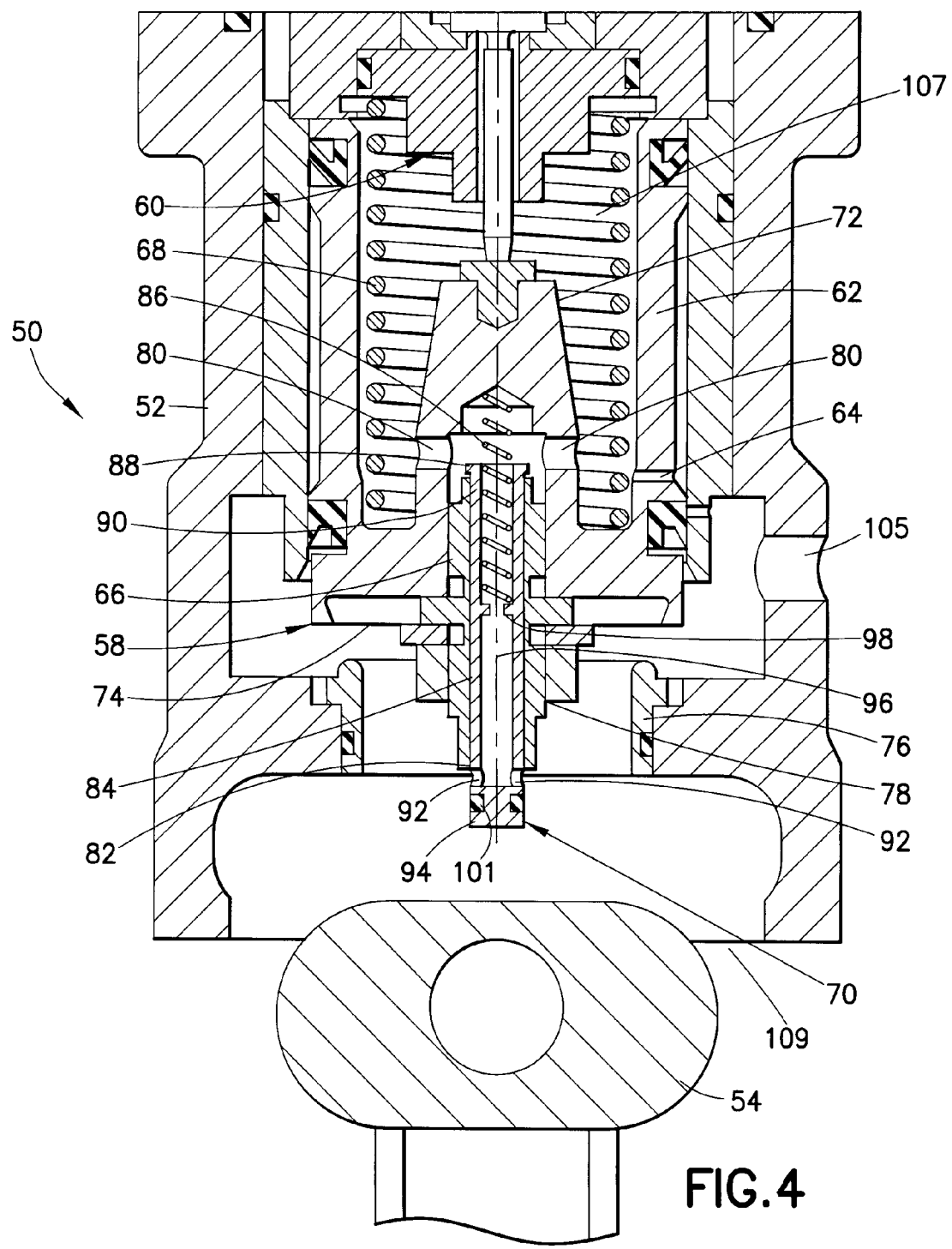
FIG. 4 is a cross-sectional view of the trip cock device shown in FIG. 1, showing the trip cock device in a second position.

Referring to FIGS. 3 and 4, one embodiment of a trip cock device 50 includes a housing 52, a handle 54, a cam dog 56, a piston assembly 58, a pilot valve assembly 60, and a fault detection valve 70. The housing 52 receives the piston assembly 58 and the pilot valve assembly 60. The piston assembly 58 includes a piston 62 having an inlet port 64, a stud 66, and a piston spring 68. The piston 62 includes a first side 72 and a second side 74 with the second side 74 biased against a piston seat 76 via the piston spring 68 and brake pipe pressure. The second side 74 of the piston 62 defines a stud opening 78 for receiving the stud 66. The first side 72 of the piston 62 defines a pair of port openings 80 that connects to and is in fluid communication with the stud opening 78. The stud 66 is secured within the stud opening 78 though any suitable fastening arrangement, such as cooperating threads (not shown) provided on the stud 66 and stud opening 78. The stud 66 defines a central opening 82 along a longitudinal axis of the stud 66 for receiving a portion of the fault detection valve 70.

The fault detection valve 70 includes a body 84 and a fault detection valve spring 86. The body 84 has an outwardly extending flange 88 positioned adjacent to a first end 90 and a pair of ports 92 adjacent to a second end 94. The body 84 also defines a central opening 96 along a longitudinal axis of the body 84 that extends from the first end 90 towards the second end 94 and stopping at a position adjacent to the pair of ports 92. Thus, the central opening 96 extends from the first end 90 of the body 84 to a position intermediate the first end 90 and the second end 94. The central opening 96 is connected to and in fluid communication with the ports 92. The body 84 further includes a spring seat 98 positioned within the central opening 96 of the body 84 and an o-ring 101 positioned adjacent to the second end 94 of the body 84. The spring seat 98 is a projection that extends radially inward from the body 84 into the central opening 96, although other suitable spring seats may be utilized. A portion of the fault detection valve spring 86 is positioned within the central opening 96 of the body 84 with one end of the spring 86 engaging the spring seat 98 and the other end engaging the piston 62 inside the stud opening 78. The body 84 is biased toward the cam dog 56 and away from the piston 62 by the fault detection valve spring 86. The body 84 is movable relative to the stud 66 in a direction that extends along the longitudinal axis of the stud 66. In particular, the body 84 is configured to slide within the central opening 82 of the stud 66. The fault detection valve spring 86 is a compression spring, although any other suitable biasing member may be utilized.

The body 84 of the fault detection valve 70 is movable between a first position (shown in FIG. 3) and a second position (shown in FIG. 4). In the first position, the pair of ports 92 in the body 84 is blocked by the stud 66 such that the brake pipe pressure, which enters through the port openings 80 in the first side 72 of the piston 62 and through the central opening 96 of the body 84, is not open to atmosphere. Thus, in the first position, the fault detection valve 70 is closed with the ports 92 being closed to atmosphere. The fault detection valve 70 is maintained in the first position through the engagement of the second end 94 of the body 84 with the cam dog 56. The o-ring 101 positioned adjacent to the second end 94 of the body 84 is configured to close the ports 92 from atmosphere when the body 84 is in the first position, although the body 84 and the stud 66 may engage each other to form a seal rather than providing the o-ring 101. In the second position, the body 84 is displaced relative to the piston 62 and the first position with the flange 88 of the body 84 engaging the stud 66 and acting as a stop to prevent the body 84 from moving all the way through the stud 66. Further, in the second position, the ports 92 of the body 84 are not blocked by the stud 66 such that the brake pipe air is open to atmosphere. In other words, in the second position, the ports 92 of the body 84 are positioned outside the central opening 82 of the stud 66. In the first position, the ports 92 of the body 84 are positioned within the central opening 82 of the stud 66. Thus, in the second position, the fault detection valve 70 is open with the ports 92 being open to atmosphere.

Figure 2:
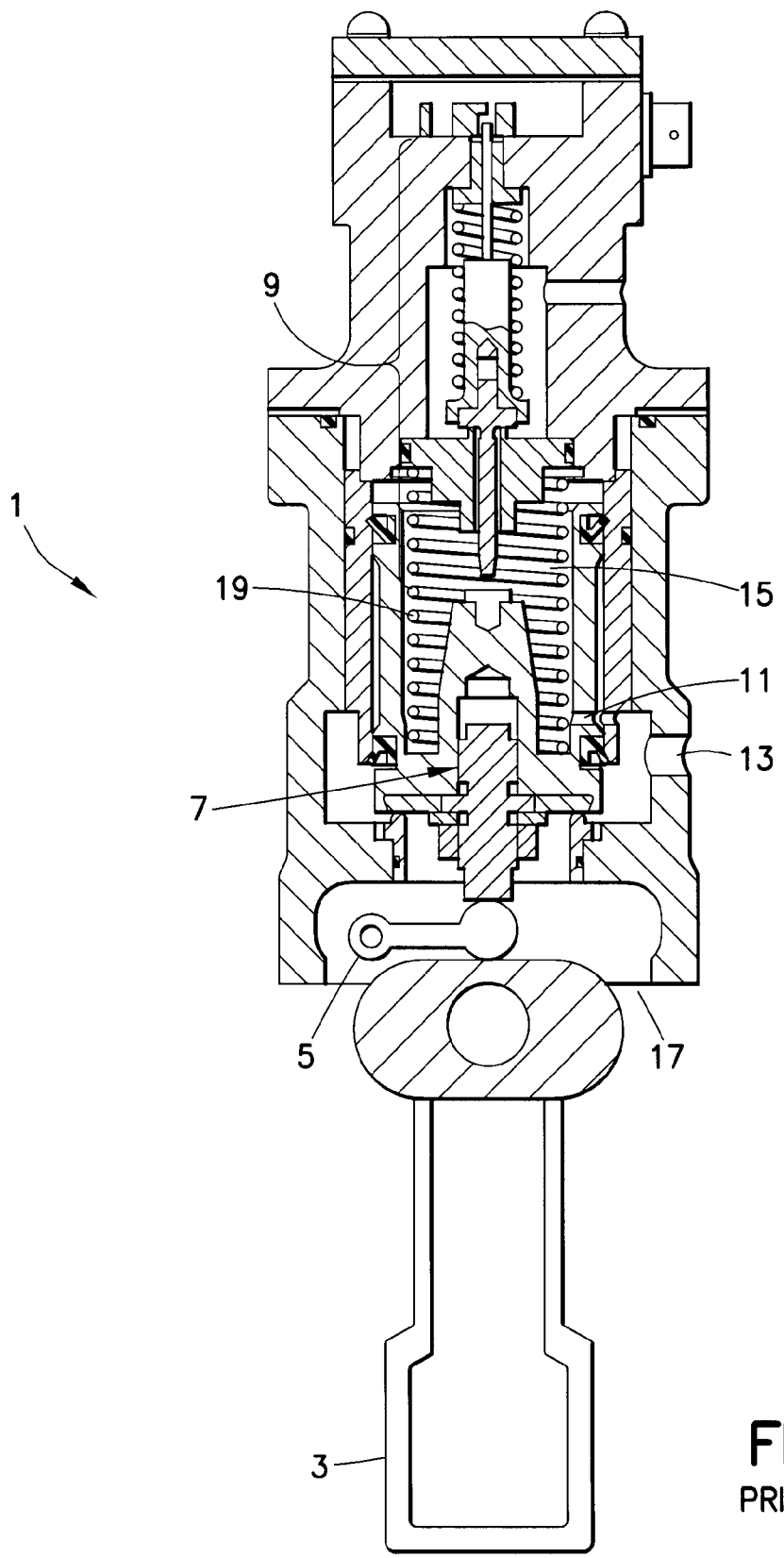
FIG. 2 is a cross-sectional view of the trip cock device shown in FIG. 1.

Under normal operating conditions, the trip cock device 50 shown in FIGS. 3 and 4 operates in the same manner as the conventional trip cock device 1 described above in connection with FIGS. 1 and 2. The trip cock device 50 initiates an emergency brake application when the handle 54 is rotated causing the cam dog 56 to move upwardly such that the cam dog 56 engages the fault detection valve 70 or the stud 66 and moves the piston assembly 58 upward. The movement of the piston assembly 58 causes the inlet port 64 to be blocked such that brake pipe air from a brake pipe inlet 105 is prevented from entering a chamber 107 on the topside of the piston assembly 58. The brake pipe air is then open to atmosphere via an exhaust opening 109 and the pressure of the brake pipe drops to initiate the emergency application of the brakes.

Under a fault condition, such as when the handle 54 or cam dog 56 are broken, the fault detection valve 70 will move to the second position as shown in FIG. 4 and described above. In particular, the body 84 of the fault detection valve 70 is biased in a direction away from the piston 62 by the fault detection valve spring 86 so that when the handle 54 or cam dog 56 are broken or removed, movement of the body 84 of the fault detection valve 70 is no longer restricted through engagement with the cam dog 56. Although not shown, a broken handle 54 would no longer engage the cam dog 56 to maintain engagement of the cam dog 56 with the fault detection valve 70 so that movement of the body 84 of the fault detection valve 70 is no longer restricted. Accordingly, when the cam dog 56 or handle 54 are removed (as shown in FIG. 4), the body 84 of the fault detection valve 70 is free to move to the second position.

If there is brake pipe pressure at the trip cock device 50, the brake pipe pressure in the chamber 107 on the topside of the piston 62 that maintains the piston 62 against the valve seat 76 will be vented out of the pair of ports 92 of the body 84 of the fault detection valve 70. The brake pipe pressure on the bottom side of the piston 62 will force the piston 62 open thereby venting the brake pipe pressure and causing an emergency brake application. If there is no brake pipe pressure at the trip cock device 50, the piston 62 will remain closed against the seat 76, but the body 84 of the fault detection valve 70 will remain in the second position with the pair of ports 92 open to atmosphere thereby venting the chamber 107 on the topside of the piston 62. If there is an attempt to charge the brake pipe, air pressure on the bottom side of the piston 62 will force it open, venting the brake pipe, and thereby preventing further operation of the car or train until the faulty trip cock device is repaired, replaced, or otherwise bypassed.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A trip cock device comprising:
   a housing;
   a cam dog;
   a handle engaging the cam dog;
   a piston assembly at least partially received within the housing, the piston assembly comprising a piston; and
   a fault detection valve secured to the piston assembly and configured to open and close, the fault detection valve engaging the cam dog when closed, and
   wherein the fault detection valve is movable relative to the piston between a first position and a second position, the fault detection valve biased toward the cam dog and engaging the cam dog when in the first position and moving to the second position when a fault condition occurs with the cam dog.

2. The trip cock device of claim 1, the piston having a first side and a second side, the second side of the piston defining an opening and the first side of the piston defining a port opening in fluid communication with the opening in the second side of the piston.

3. The trip cock device of claim 2, wherein a portion of the fault detection valve is positioned within the opening in the second side of the piston.

4. The trip cock device of claim 3, wherein the fault detection valve comprises a body and a valve spring, the body having a first end and a second end and defining a central opening.

5. The trip cock device of claim 4, wherein the central opening of the fault detection valve extends from the first end of the body to a position intermediate the first end and the second end of the body, the central opening of the body receiving a portion of the valve spring of the fault detection valve.

6. The trip cock device of claim 5, wherein the body of the fault detection valve defines a port that is in fluid communication with the central opening.

7. The trip cock device of claim 6, wherein the body of the fault detection valve is movable relative to the piston between a first position and a second position, the body of the fault detection valve biased toward the cam dog by the valve spring when in the first position.

8. The trip cock device of claim 7, wherein the port of the body of the fault detection valve is configured to be closed to atmosphere in the first position when the fault detection valve is closed and open to atmosphere in the second position when the fault detection valve is open.

9. The trip cock device of claim 7, wherein the piston assembly further comprises a stud having a central opening, a portion of the stud secured within the opening in the second side of the piston, a portion of the body of the fault detection valve received by and movable within the central opening of the stud.

10. The trip cock device of claim 9, wherein the body of the fault detection valve includes a flange positioned adjacent to the first end of the body, the flange configured to engage the stud when the fault detection valve is in the second position.

11. The trick cock device of claim 9, wherein the port of the fault detection valve is positioned within the central opening of the stud when in the first position, and wherein the port of the fault detection valve is positioned outside of the central opening of the stud when in the second position.

12. The trip cock device of claim 5, wherein the body of the fault detection valve includes a spring seat that engages a portion of the valve spring.

13. The trip cock device of claim 12, wherein the spring seat of the fault detection valve comprises a protrusion extending radially inward from the body of the fault detection valve.

14. A fault detection valve comprising:
   a body having a first end and a second end, the body defining a central opening and a port, the body configured to engage a cam dog of a trip cock device; and
   a biasing member configured to move the body between a first position where the port is closed to atmosphere and a second position where the port is open to atmosphere, the body configured to stay in the first position through engagement with a portion of the cam dog of the trip cock device,
   wherein the central opening of the body extends from the first end of the body to a position intermediate the first end and the second end of the body,
   wherein the biasing member comprises a compression spring, a portion of the compression spring received within the central opening of the body, and
   wherein the body includes a spring seat that extends radially inward from the body, a first end of the compression spring engaging the spring seat and a second end of the compression spring configured to engage a piston of the trip cock device.

* * * * *